United States Patent [19]

Nakagawa et al.

[11] Patent Number: 4,871,815
[45] Date of Patent: Oct. 3, 1989

[54] METHOD OF MAKING CHLOROSULFONATED POLYETHYLENE

[75] Inventors: Tatsushi Nakagawa, Shinnanyo; Mamoru Narui, Kudamatsu; Yasuhiro Sakanaka, Shinnanyo, all of Japan

[73] Assignee: Toyo Soda Manufacturing Co., Ltd., Shinnanyo, Japan

[21] Appl. No.: 305,261

[22] Filed: Feb. 2, 1989

Related U.S. Application Data

[60] Division of Ser. No. 161,243, Feb. 19, 1988, abandoned, which is a continuation of Ser. No. 942,047, Dec. 16, 1986, abandoned, which is a continuation of Ser. No. 715,762, Mar. 25, 1985, abandoned, which is a continuation of Ser. No. 515,902, Jul. 21, 1983, abandoned.

[30] Foreign Application Priority Data

Jul. 21, 1982 [JP] Japan .................. 57-125848

[51] Int. Cl.$^4$ .............................. C08F 8/38
[52] U.S. Cl. ....................... 525/344; 525/333.9
[58] Field of Search ............................. 525/344

[56] References Cited

U.S. PATENT DOCUMENTS

| | | | |
|---|---|---|---|
| 2,586,363 | 2/1952 | McAlevy | 525/344 |
| 3,079,362 | 2/1963 | Nersasian | 525/344 |
| 3,131,159 | 4/1964 | Orthner | 525/344 |
| 3,180,856 | 4/1965 | Szalla | 525/344 |
| 3,296,222 | 1/1967 | Dixon | 525/344 |
| 3,299,014 | 1/1967 | Kalil | 525/344 |

OTHER PUBLICATIONS

Abu-isa, Ismat A. et al., J. Polymer Science, vol. 11, 225–231, (1973).

Primary Examiner—Christopher Henderson
Attorney, Agent, or Firm—Armstrong, Nikaido, Marmelstein, Kubovcik & Murray

[57] ABSTRACT

An excellent cold-proof chlorosulfonated polyethylene and a method of manufacturing the same featured in that a polyethylene is once dissolved in a solvent by heating up them over a dissolution temperature of the polyethylene, then cooled and thus obtained homogeneous solution of the polyethylene is allowed to react with a sulfuryl chloride in the presence of a catalyst of a radical generating agent in the dissolution temperature region of the polyethylene or in a temperature region lower than the former one.

2 Claims, 2 Drawing Sheets

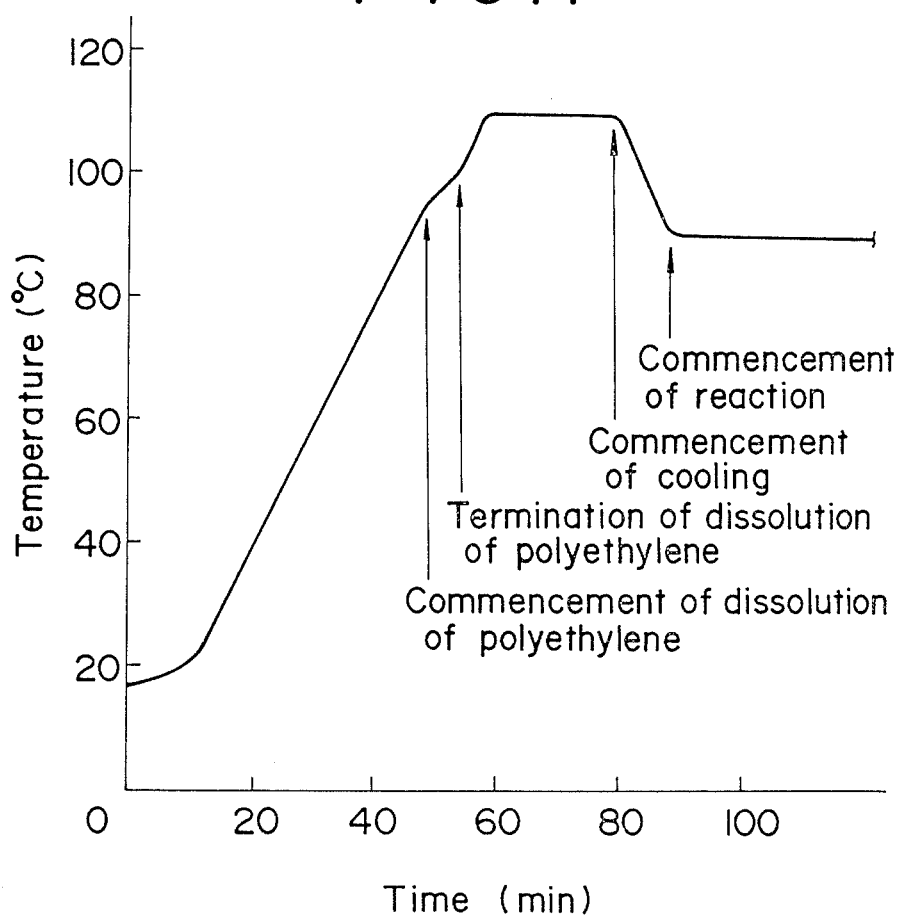

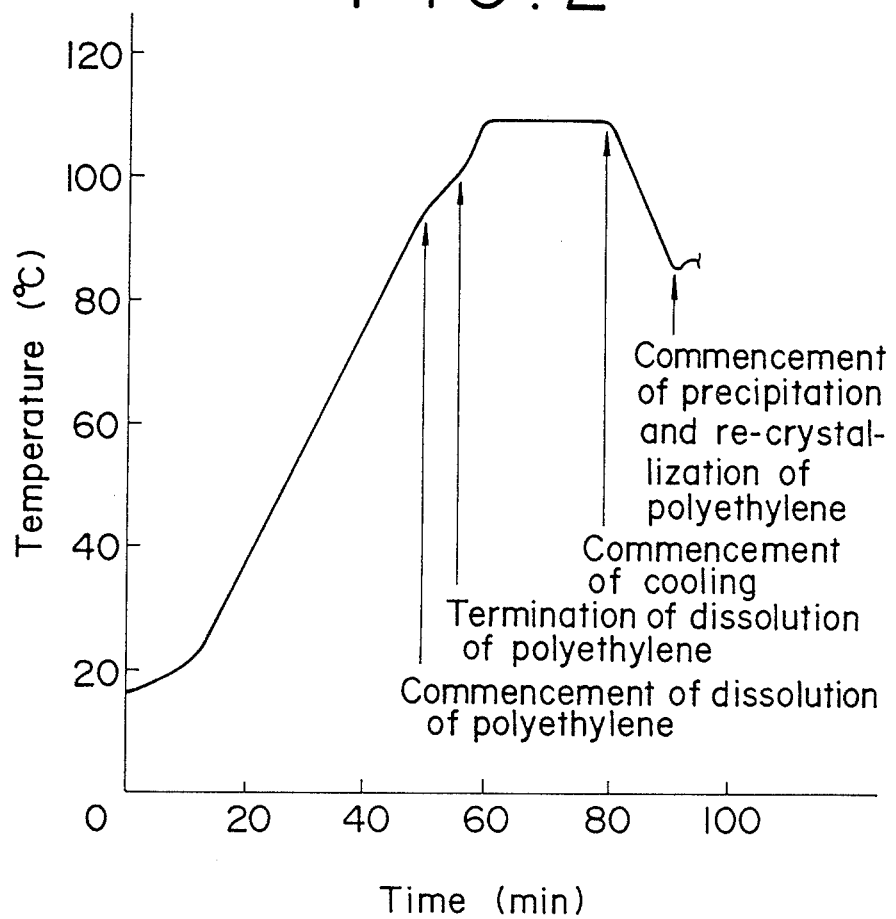

METHOD OF MAKING CHLOROSULFONATED POLYETHYLENE

This is a division, of application Ser. No. 161,243, filed on Feb. 19, 1988, now abandoned which is a continuation application of Ser. No. 942,047, filed on Dec. 16, 1986, now abandoned, which is a continuation of U.S. Ser. No. 715,762, filed on Mar. 25, 1985, now abandoned, which is a continuation of U.S. Ser. No. 515,902, filed on July 21, 1983, now abandoned.

DETAILED DESCRIPTION OF THE INVENTION

The present invention relates to an improvement of a chlorosulfonated polyethylene and a process of manufacturing the improved chlorosulfonated polyethylene by allowing a polyethylene to react with a sulfuryl chloride in the presence of a halogenated hydrocarbon solvent.

The chlorosulfonated polyethylene is a chlorosulfonated one that the polyethylene is chlorinated and chlorosulfonated so as to contain 20–60 wt % (preferably 25–45 wt %) of chlorine and 0.3–3.0 wt % (preferably 0.8–1.5 wt %) of sulfur in the molecule thereof, and it can be easily cured with a metallic oxide and a curing accelerator to give a conventionally used elastomer which is excellent in weather-proof, ozone-proof, thermal resistance and resistance to chemicals.

However, the chlorosulfonated polyethylene suffers from a defect that it is deficient in a cold-proof, so it is hardened quickly at a temperature of lower than 5° C.

The property such above greatly disturbs the application of the chlorosulfonated polyethylene for the industrial good fields of electric wires, hose, gaskets, etc. and therefore the improvement of the property has been desired.

The present invention is directed to eliminate the disadvantage and to propose a chlorosulfonated polyethylene which is excellent in a cold-proof without being hardened at a low temperature.

It has been known a process of manufacturing the chlorosulfonated polyethylene that the polyethylene dissolved in hydrogenated hydrocarbon is allowed to react with sulfuryl chloride in the presence of a catalyst of a radical generating agent (Refer to the Japanese Patent Publication No. 39-12113). This method is attractive industrially on the following reasons.

(1) The reaction process is simplified because the chlorination and the chlorosulfonation are carried out at a stroke.

(2) It is possible to increase the concentration of polyethylene.

(3) The time of reaction can be shortened.

However, there is still a problem that the above process can not propose the chlorosulfonated polyethylene being excellent in the cold-proof.

In order to overcome the above situation, we have studied the problem earnestly and developed an excellent cold-proof chlorosulfonated polyethylene and a process of manufacturing the same by controlling carefully the temperature throughout from the dissolution process to the reaction process of polyethylene, employing halogenated hydrocarbon as solvent, and by carrying out the reaction with controlling the dissolving condition of said solution.

The invention will be more clearly understood with reference to the following examples.

Firstly, a solution used in the reaction should be a homogeneous solution of polyethylene uniformly dissolved in the halogenated hydrocarbon.

It is because, when a solution of polyethylene being in a suspended condition without being dissolved is employed in the reaction, the chlorosulfonated polyethylene is not only impaired greatly in a property of rubber but also it is difficult to isolate it by drying uniformly the resultant polymer solution in the suspended condition.

The product such as above has no commercial value as the chlorosulfonated polyethylene.

From this point of view, in case the chlorosulfonated polyethylene is manufactured from a homogeneous solution of polyethylene in which halogenated hydrocarbon is the solvent, the reaction temperature of said reaction has been generally set at a temperature higher than the dissolution temperature of polyethylene.

It is also an important requirement in this invention that the polyethylene is dissolved homogeneously into the halogenated hydrocarbon by heating the halogenated hydrocarbon solution at a temperature higher than a dissolution temperature of the polyethylene.

However, it is known that, after the polyethylene is dissolved into the halogenated hydrocarbon to form a homogeneous solution, when said temperature is lowered, the solution still keeps the homogeneous condition within a certain range of temperature and time even if the temperature is lowered at a further lower temperature region passing through a dissolution temperature region of the polyethylene.

In other words, within a certain period of time, the phenomena that the polyethylene precipitates and crystallizes in the halogenated hydrocarbon does not occur, even if said temperature is lowered to pass through the dissolution temperature region.

The solution of such condition is a homogeneous solution, but it can be said as a semi-stable homogeneous solution which is formed temporarily due to the fall of the temperature. Surprisingly, we discovered that the homogeneous solution, in which the polyethylene is uniformly dissolved, is allowed to react with the sulfuryl chloride at the temperature region lower than this dissolution temperature region of the polyethylene in the presence of a catalyst of a radical generating agent to give a chlorosulfonated polyethylene which has a featured property of greatly improved cold-proof. This invention is derived from the discovery.

Namely, this invention relates to an excellent cold-proof chlorosulfonated polyethylene and a process of manufacturing the same featured in that, after the polyethylene is dissolved into the halogenated hydrocarbon to form a homogeneous solution, the solution is kept in a homogeneous condition as with lowering the solution temperature thereof to the dissolution temperature region of the polyethylene or the temperature region lower than the former one, and thus performed homogeneous solution is allowed to react with sulfuryl chloride in the presence of the radical generating agent as catalyst.

The dissolution temperature region in this invention, is defined as a range of temperature from a temperature that the polyethylene commences to dissolve into the halogenated hydrocarbon to a temperature that this dissolution is completed when the temperature of a heterogeneous solution of halogenated hydrocarbon in which the polyethylene suspends is elevated, and an upper limit of the region thereof is called a dissolution temperature.

In this invention, after the polyethylene is dissolved homogeneously, the temperature thereof is lowered and the solution is subjected to reacting with sulfuryl chloride in the dissolution temperature region of the polyethylene or in a temperature region lower than the former one. In case the polyethylene is initially dissolved, the solution may be heated to an unlimited temperature, so long as it is heated at a temperature higher than the dissolution temperature of the polyethylene.

As the way of dissolution, it is generally carried out that the solution of the halogenated hydrocarbon with dispersed polyethylene is heated to a elevated temperature, but it may be also employed that the polyethylene is directly added to the halogenated hydrocarbon heated up to more than the dissolution temperature of the polyethylene.

The dissolution temperature of the polyethylene depends on the kind, melting point and concentration of the polyethylene or a reaction condition such as temperature raising rate, and heat-transfering condition and stirring condition in the reactor and so forth, while, since a quantity of heat necessary for the dissolution is absorbed on the occasion of the dissolution of the polyethylene, the dissolution temperature region of the polyethylene is simply measured from the observation of an endothermic phenomenon mentioned above.

For example, in a process of raising the temperature of the solution for dissolving the polyethylene into the halogenated hydrocarbon, there is a method of determining a dissolution temperature region by observing a rise of this internal temperature and measuring a blunting of temperature raising rate due to the endothermic phenomenon corresponding to the dissolution of the polyethylene. (Refer to FIG. 1.)

On the other hand, the phenomena that the polyethylene, which is dissolved in the halogenated hydrocarbon, re-precipitates in the halogenated hydrocarbon and crystallizes are observed by measuring quantity of heat released on the occasion of the crystallization of the polyethylene. (Refer to FIG. 2.)

Further, on the occasion of the above phenomena, a heterogeneous solution of the halogenated hydrocarbon with suspended polyethylene therein is formed.

The stability of the polymer solution in a temperature region below the dissolution temperature (the homogeneous solution and the heterogeneous solution) depends on the kind, melting point and concentration of the polyethylene used, or cooling rate of cooling process carried out after the dissolution of the polyethylene, stirring condition in reactor, heat-transfering condition in reactor, and so forth.

Therefore, the reaction temperature can not be definitely determined, but is preferably in a range of 85°–105° C.

The reaction temperature of lower than 85° C. results in an increase of the cooling rate accompanied with inefficiency and lowers the reaction rate of sulfuryl chloride.

Furthermore, the reaction temperature of higher than 105° C. is not preferable for preparing the chlorosulfonated polyethylene which is excellent in the cold-proof aimed in this invention. The factor is most important for the performance of this invention.

In the cooling process of the polymer solution after the polyethylene is dissolved, it is effective to cool the solution quickly with a cooling rate of not less than 1.0° C./min.

It is because a slower cooling rate results in the precipitation of the polyethylene during the cooling.

The phenomenon that the polyethylene dissolved in the halogenated hydrocarbon re-precipitates to form the heterogeneous solution can be observed by the measurement of the exothermic phenomenon accompanied with the re-crystallization of the polyethylene as mentioned above.

Further, the above phenomenon can be possibly recognized from a fact of a large load given to the stirring of the reaction when the precipitation of the polyethylene commences.

When the dissolved polyethylene again precipitates and crystallizes from the halogenated hydrocarbon solution as in the above manner, it becomes very difficult that the solution is continuously allowed to react with sulfuryl chloride.

It is because, when the polyethylene having concentration of not less than 5 wt % completely precipitates in the halogenated hydrocarbon the resultant solution becomes a wax or jelly -like substance, and not only it makes the stirring impossible but also it may block a pouring inlet of sulfuryl chloride inserted into the solution.

On the ground stated above, the reaction should be commenced in a condition that the halogenated hydrocarbon solution in which the polyethylene dissolves is existing as a homogeneous solution while the solution temperature is lowering toward below the dissolution temperature.

More, prior to the reaction, it is preferable for a purpose of setting a reaction temperature to seek a dissolution temperature of the polyethylene and a temperature at which the previously dissolved polyethylene re-precipitates and crystallizes in the halogenated hydrocarbon under the same condition as the reacting condition.

Still more, it is preferable for an examination of the reacting condition to observe by means of the instrument such as DSC (Differential Scanning Calorimeter), etc, the phenomenon of the dissolution in the polyethylene into the halogenated hydrocarbon or the phenomenon of the crystallization thereof due to the cooling.

However, since a system subjected to an actual reaction is different from those instruments above in the stirring and heat-transfer etc. of the reactor, it should be recognized that the experimental results mentioned above can not be directly applied to the actual reaction system.

When the reaction commences by the addition of sulfuryl chloride and several percents of chloride is introduced in the polyethylene, the solubility of the polymer in the halogenated hydrocarbon is greatly increased.

Therefore, the precipitation of the polymer can be prevented even at a temperature region lower than the dissolution temperature of the polyethylene.

The reaction is performed by the addition of sulfuryl chloride accompanied with using the radical generating agent such as α,α'-azobisisobutyronitrile, azobiscyclohexanecarbonitrile, 2,2'-azobis(2,4-dimethylvaleronitrile), benzoyl peroxide, t-butyl peroxide, t-butyl perbenzoate, acetyl peroxide, etc. as catalyst.

On that occasion, the amine such as pyridine, quinoline, aniline, dimethylaniline, butylamine, nicotine, quinaldine, piperizine, etc. is used as the auxiliary catalyst to the chlorosulfonation reaction.

The use amount of sulfuryl chloride depends on the amount of chlorine added to the polyethylene.

On the other hand, sulfuryl chloride participates in both of (1) Chlorination reaction and (2) Chlorosulfonation reaction in combination of using the radical generating agent as catalyst.

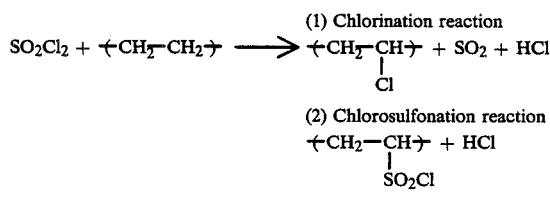

(1) Chlorination reaction $$SO_2Cl_2 + \text{-(CH}_2\text{-CH}_2\text{)-} \longrightarrow \text{-(CH}_2\text{-CH)-} + SO_2 + HCl$$
$$\hspace{4cm} |$$
$$\hspace{4cm} Cl$$

(2) Chlorosulfonation reaction $$\text{-(CH}_2\text{-CH)-} + HCl$$
$$|$$
$$SO_2Cl$$

provided that —(—$CH_2$—$CH_2$—)— designates a chain of the polyethylene.

The occurring proportion of the reactions for (1) and (2) above is affected by the reaction condition such as reaction temperature, reaction pressure, etc., but it can be controlled by the addition amount of the amine of the auxiliary catalyst.

By these means, the amount of sulfur added to the polyethylene can be freely controlled.

The chlorosulfonated polyethylene can display a property of elastomer by the reason that crystals of the polyethylene are destroyed and thereby amorphous polymers are formed by introducing chlorine into the polyethylene.

Accordingly, the cold-proof (particularly the hardness) of the chlorosulfonated polyethylene varies with the amount of chlorine contained therein.

For example, as to the high density polyethylene, since the crystals of the polyethylene are not completely destroyed in a region of the addition amount of chlorine being lower than about 33-37 wt %, the resulting chlorosulfonated polyethylene becomes a crystalline polymer and is poor in the cold-proof.

On the other hand, the chlorosulfonated polyethylene of containing more than about 33-37 wt % chlorine whose starting material is the high density polyethylene becomes an amorphous polymer, but its glass transition temperature is increased due to an increase of a cohesive energy by the addition of chlorine and therefore the cold-proof thereof decreases as the amount of chlorine increases.

On the grounds mentioned above, the chlorosulfonated polyethylene whose starting material is the high density polyethylene and which containes about 33-37 wt % of added chlorine is most excellent in the cold-proof.

From these facts, it is preferable for the evaluation of the cold-proof that the addition amount of chlorine is about 33-37wt %.

The polyethylene of this invention is defined as those including high density polyethylene (HDPE), low density polyethylene (LDPE) and linear low density polyethylene (L-LDPE) and ethylene copolymers such as ethylene-vinyl acetate copolymer (EVA).

However, in case of thinking much of mechanical properties of product, it is preferable to employ the high density polyethylene or the linear low density polyethylene. In the time of reaction, the polyethylene is used in a concentration of 3-30 wt % to the halogenated hydrocarbon.

As the halogenated hydrocarbon, carbon tetrachloride, chloroform, dichloroethane, trichloroethane etc. can be used, but particularly carbon tetrachloride is preferable.

For the index of the cold-proof, the hardness of 0° C. is measured. In this method, the hardness of a sample which is allowed to stand for five hours in an air-type thermostat maintained at 0° C. is measured, and a shape of the sample and regulations of hardness-meter etc. are set the same as the description in JIS K-6301.

The reason why the time of allowing to stand in the thermostat is set five hours lies in that, when the sample is put into the air-type thermostat maintained at 0° C., the hardness thereof increases with lapse of time, but the increase of the hardness ceases after about three hours and thereafter the hardness shows a constant value.

Furthermore, the difference between the hardness at the ordinary temperature (23° C.) and the hardness at 0° C. is determined and this value can be considered as the index of the cold-proof.

The hardness at 0° C. shows that its value is smaller, the more excellent the cold-proof is.

Also, as to the difference between the hardness at the ordinary temperature (23° C.) and the hardness at 0° C., its value is smaller, the more excellent the cold-proof is.

Furthermore, as the index of the cold-proof, the dynamic viscoelasticity thereof is measured by employing the directly readable type measuring instrument of viscoelasticity (Rheovibron, model DDV-III manufactured by Toyo Borldain Co. Ltd), and the glass transition temperature of the chlorosulfonated polyethylene can be determined therefrom.

The glass transition temperature is one of the most important physical properties, and in case of the amorphous polymer such as the chlorosulfonated polyethylene the cold-proof is increasingly excellent insofar as this value lies at lower temperature.

These measurements demonstrated that this invention had improved the cold-proof of the chlorosulfonated polyethylene in all cases.

On the other hand, no variation can be found in other characteristics such as Mooneys' viscosity, tension characteristics thereof, and therefore all samples showed excellent value as rubber.

BRIEF EXPLANATION OF THE DRAWINGS

FIG. 1 and FIG. 2 represent diagrams of showing variation of the inside temperature in the autoclave in case of example 1.

EMBODIMENT EXAMPLES

Then, this invention is described in details by exemplifying examples and comparative examples, but these are all examples for help of understanding this invention and therefore this invention does not suffer from any restriction by those examples.

EXAMPLE 1

Into an autoclave of 10 liters volume, 1.0 Kg of polyethylene having 6.5 g/10 min of melt-index and 0.959 g/C.C. of density and 10 Kg of carbon tetrachloride of solvent were charged, and they were heated under an increased pressure. The temperature thereof was elevated by an external electric heater, but it was set so that the calorimetric amount added per unit time might be constant. The inside temperature of the autoclave was automatically recorded on a recording paper by a temperature recording meter.

The inside temperature was elevated in a rate of 2.0° C./min, but the tendency of temperature elevation became dull in a temperature region of 96°–101° C. This was shown in FIG. 1. The variation of this temperature elevating line means that polyethylene has dissolved into carbon tetrachloride, and this is a phenomenon resulting from absorption of the calorimetric amount required for the dissolution of polyethylene crystals. That is, polyethylene of this example has a dissolution temperature region of 96°–101° C.

Further, the inside temperature was elevated to 110° C., and after the stirring was continued for 20 minutes at 110° C., the inside temperature was lowered at a rate of 2.0° C./min. (Refer to FIG. 1.)

At the time the inside temperature arrived at 90° C., 2.15 Kg of sulfuryl chloride with 3.0 g of α,α'-azo-bis-isobutyronitril and 0.094 g of pyridine of the auxiliary catalyst were added into the autoclave and thereby the reaction was started. After completion of adding them, the inside temperature of the autoclave was lowered to 75° C. and nitrogen was blown into at a flow rate of 3.0 liters/min to purge gases of hydrogen chloride and sulfur dioxide etc. remaining in the polymer solution out of this system.

Then, 15 g of 2,2'-bis(4-glycidyloxyphenyl) propane was added as a stabilizing agent.

Thereafter, the polymer solution was taken out of the autoclave and the resultant was dried by using a drum-dryer.

As a result of analysis thereof, it was recognized that the chlorosulfonated polyethylene contained 35.9 wt % of chlorine and 1.0 wt % of sulfur. This chlorosulfonated polyethylene was cured with the following compounding formulation, and the physical properties thereof were measured. These results are shown in Table 1.

| | |
|---|---|
| Chlorosulfonated polyethylene | 100 wt. parts |
| Magnesium oxide | 10 " |
| Curing accelerator | 0.8 " |
| Sunseller - 22C | |
| (Manufactured by Sanshin Kagaku Kogyo) | |

It was cured under pressing at 150° C. for 40 minutes. The measurement of the physical properties was based on JIS K-6301.

Furthermore, prior to performance of this example, the dissolution temperature of polyethylene and the temperature at which the once dissolved polyethylene reprecipitates from carbon tetrachloride and crystallizes were determined under the same condition as in Example 1.

The temperature at which the once dissolved polyethylene precipitates from carbon tetrachloride and crystallizes was determined by continuing the cooling thereof intact without adding reactants of sulfuryl chloride etc., although polyethylene was dissolved, followed by lowering the inside temperature thereof.

These temperatures were determined by measuring the inside temperature and observing the endothermic phenomenon accompanied with the dissolution of polyethylene and the exothermic phenomenon accompanied with the crystallization of polyethylene. The variation of the inside temperature of the autoclave is shown in FIG. 2. At the first the inside temperature was elevated with lapse of time, but the endothermic phenomena due to the dissolution of polyethylene was observed at 96°–101° C. (This is the same as in FIG. 1.)

After the inside temperature was further elevated to 110° C., the inside temperature was lowered at the same rate as in Example 1, but the inside temperature reversely elevated when the inside temperature reached 86° C.

This exothermic phenomenon is due to crystallization of polyethylene.

From this fact, it was understood that the temperature at which the once dissolved polyethylene reprecipitates from carbon tetrachloride and crystallizes is 86° C.

EXAMPLE 2

In an autoclave of 10 liters volume, 0.7 Kg of polyethylene having 1.0 g/10 mins of melt-index and 0.956 g/C.C. of density and 10 Kg of carbon tetrachloride of solvent were charged and they were heated under an increased pressure. The temperature was elevated by means of a external heater so that calorimetric amount added per unit time might be constant. The temperature inside the autoclave was recorded on a recording paper by means of a temperature recording meter. The inside temperature was elevated at a rage of 2.0° C./min, but the temperature elevation per unit time became dull in the temperature region of 97°–102° C. This means that, in this temperature region, polyethylene has been dissolved and the solution has become homogeneous. That is, the dissolution temperature region of polyethylene is 97°–102° C.

Then, after the inside temperature was further elevated to 110° C., the inside temperature was lowered at a rate of 2.0° C./min. As the time the inside temperature reached 90° C., the reaction was started by adding 1.51 Kg of sulfuryl chloride together with 2.0 g of α,α'-azo-bis-isobutyronitril and 0.090 g of pyridine of the auxiliary catalyst into the autoclave.

After completion of the adding, the inside temperature of the autoclave was lowered to 70° C. and nitrogen was blown thereinto at a flow rate of 3.0 liters/min, thereby purging hydrogen chloride and sulfur dioxide remaining in the polymer solution out of the system. Then, 11 g of 2,2'-bis(4-glycidyloxyphenyl) propane was added therein as the stabilizing agent.

Thereafter, the polymer solution was taken out of the autoclave and the product was dried by a drum-dryer.

As a result of analysis thereof, it was recognized that the product contained 35.8 wt % of chlorine and 1.0 wt % of sulfur.

This chlorosulfonated polyethylene was cured in the same way as Example 1 and was subjected to measurement of physical properties thereof. The result is shown in Table 1.

Furthermore, prior to performance of Example 1, the dissolution temperature of polyethylene and the temperature at which the once dissolved polyethylene reprecipitates from carbon tetrachloride and crystallizes were determined under the same condition as in Example 2.

This way of determining these temperatures was the same one as described in Example 1.

As this result, the dissolution temperature region of polyethylene was 97°–102° C. and the temperature at which the once dissolved polyethylene reprecipitated from carbon tetrachloride and recrystallized was 88° C.

EXAMPLE 3

Into an autoclave of 10 liters volume, 1.0 Kg of polyethylene having 13 g/10 mins of melt-index and 0.957 g/C.C. of density and 10 Kg of carbon tetrachloride of solvent were charged, and they were heated under an increased pressure. The temperature inside the autoclave was recorded automatically on a recording paper by a temperature recording meter. The temperature elevation was set so that the calorimetric amount added per unit time by an outside electric heater might be constant.

The inside temperature was elevated at a rate of 2.0° C./min, but the temperature elevation per unit time became dull in the temperature region of 96°–100° C. This means that polyethylene has been dissolved to give a homogeneous solution in this temperature region. That is, the dissolution temperature region thereof in this Example was 96°–100° C.

Thereafter, the inside temperature was elevated to 110° C. and the inside temperature was lowered at a rate of 2.0° C./min.

At the time the inside temperature reached 90° C., the reaction was started by adding 2.15 Kg of sulfuryl chloride together with 3.0 g of benzoyl peroxide and 0.138 g of quinoline of the auxiliary catalyst into the autoclave.

After completion of the adding, the inside temperature of the autoclave was lowered to 70° C., nitrogen was blown into at a flow rate of 3.0 liter/min, thereby purging hydrogen chloride, sulfur dioxide remaining in the polymer solution out of the system.

As the stabilizing agent, 15 g of 2,2′-bis(4-glycidyloxyphenyl) propane was added.

Thereafter, the polymer solution was taken out of the autoclave and the product was dried by a drum dryer.

As a result of the analysis thereof, it was recognized that the product contained 35.8 wt % of chlorine and 1.0 wt % of sulfur.

This chlorosulfonated polyethylene was cured in the same way as in Example 1 and its physical properties were measured. These results are shown in Table 1.

Furthermore, prior to performance of this example, the dissolution temperature of polyethylene and the temperature at which the once dissolved polyethylene reprecipitates from carbon tetrachloride and re-crystallizes were determined, the way of determining these temperature was the same as described in Example 1.

As this result, the dissolution temperature region was 96°–100° C. and the temperature at which the once dissolved polyethylene reprecipitated from carbon tetrachloride and crystallized was 85° C.

COMPARATIVE EXAMPLE 1

Employing the same autoclave as in Example 1, 1.0 Kg of the same polyethylene as in Example 1 and 10 Kg of carbon tetrachloride of solvent were charged therein and the inside temperature was raised in the same way as in Example 1.

A temperature recording meter indicating the inside temperature displayed the same dullness of the temperature elevation in 96°–101° C. as in Example 1 and therefore it demonstrated that polyethylene had been dissolved. As a matter of course, the dissolution temperature region of polyethylene was the same as one of Example 1 (96°–101° C.).

After elevating the temperature to 110° C. followed by stirring for 20 minutes, 2.15 Kg of sulfuryl chloride together with 3.0 g of $\alpha,\alpha'$-azo-bis-isobutyronitril and 0.135 g of pyridine of the auxiliary catalyst were, without cooling the autoclave, added into the autoclave in state of maintaining the temperature of 110° C., and thereby the reaction was started.

The reason why the addition amount of pyridine of the auxiliary catalyst is different from that of Example 1 lies in that, if supposing they are the same amount, the addition amount of sulfur in the product varies with difference of the reaction temperature.

This is a synthetic technique to make the addition amount of sulfur in the product to be 1.0 wt %.

After completion of the reaction, removal of the remaining acids, addition of the stabilizing agent and drying were carried out by the same procedure as in Example 1 to isolate the product.

As a result of the analysis thereof, it was recognized that this product contained 35.9 wt % of chlorine and 1.0 wt % of sulfur.

This chlorosulfonated polyethylene was cured in the same way as in Example 1 and its physical properties were measured. These results were shown in Table 1.

In this Comparative Example, excellent cold-proof was not obtained, because the reaction temperature was higher than the dissolution temperature.

COMPARATIVE EXAMPLE 2

Employing the same autoclave as in Example 1, 1.0 Kg of the same polyethylene as in Example 1 and 10 Kg of carbon tetrachloride of solvent were charged therein and the inside temperature was raised in the same way as in Example 2. However, the temperature elevation was continued until the inside temperature reached 90° C., and, after it reached 90° C., the temperature was kept constant with stirring for 1 hour.

This means that the temperature was not yet raised till the dissolution temperature region (96°–101° C.).

Maintaining the temperature to be 90° C., the reaction was started by adding 2.15 Kg of sulfuryl chloride together with 3.0 g of $\alpha,\alpha'$-azo-bis-isobutyronitril and 0.094 g of pyridine of the auxiliary catalyst in the autoclave. That is, the reaction temperature was the same as that of Example 1.

Thereafter, removal of the reamining acids, and addition of the stabilizing agent were carried out in the same way as in Example 1 and the polymer solution was taken out of the autoclave.

This polymer solution was a heterogeneous solution wherein a lot of polyethylene particles suspended in carbon tetrachloride, because the dissolution of polyethylene was not performed. Therefore, this product had no value of merchandise as chlorosulfonated polyethylene.

COMPARATIVE EXAMPLE 3

Employing the same autoclave as in Example 1, 0.7 Kg of the same polyethylene as in Example 2 and 10 Kg of carbon tetrachloride of solvent were charged therein and the inside temperature was raised in the same way as in Example 2.

A temperature recording meter indicating the inside temperature displayed the same dullness of temperature elevation at 97°–102° C. as in Example 2, which meant that polyethylene had been dissolved. The dissolution temperature region was equal to that of Example 2 (97°–102° C.).

After further raising the temperature to 110° C., the reaction was started by adding 1.51 Kg of sulfuryl chloride together with 2.0 g of α,α'-azo-bis-isobutyronitril and 0.130 g of pyridine of an auxiliary catalyst into the autoclave at 110° C., without cooling the autoclave.

The reason why the amount of pyridine of the auxiliary catalyst is different from that of Example 2 lies in that it is a synthetic technique to make the amount of sulfur added to the product to be 1.0 wt %.

After completion of the reaction, removal of the remaining acid, addition of the stabilizing agent and drying were carried out to give the product.

As a result of its analysis, it was recognized that this chlorosulfonated polyethylene contained 35.9 wt % of chlorine and 1.0 wt % of sulfur.

This was subjected to curing and the physical properties of the cured product were measured to give a result represented in Table 1.

In this Comparative Example, excellent cold-proof was not obtained, because the reaction temperature was higher than the dissolution temperature of polyethylene.

COMPARATIVE EXAMPLE 4

Employing the same autoclave as in Example 2, 0.7 Kg of the same polyethylene as in Example 2 and 10 Kg of carbon tetrachloride of solvent were charged thereinto and the inside temperature was raised in the same way as in Example 2.

However, the temperature raising was carried out until it reached 90° C. and thereafter the temperature was kept constant with stirring for 1 hour. This means that the temperature raising was not carried out till the dissolution temperature region of polyethylene (97°-102° C.).

Maintaining the inside temperature to be 90° C., the reaction was started by adding 1.51 Kg of sulfuryl chloride together with 2.0 g of α,α'-azo-bis-isobutyronitril and 0.090 g of pyridine of the auxiliary catalyst into the autoclave. That is, the reaction temperature was the same as that of Example 2.

Thereafter, removal of the remaining acids and addition of the stabilizing agent were carried out and then the polymer was taken out of the autoclave, the polymer taken out thereof was a heterogeneous solution wherein particles of polyethylene suspended in carbon tetrachloride, because the dissolution of polyethylene was not performed therein. The product like this has no merchandise value as chlorosulfonated polyethylene.

COMPARATIVE EXAMPLE 5

Employing the same autoclave as in Example 3, 1.0 Kg of the same polyethylene as in Example 3 and 10 Kg of carbon tetrachloride of solvent were charged thereinto and the inside temperature was raised in the same manner as in Example 3. A temperature recording meter indicating the inside temperature displayed the same dullness of the temperature raising as that of Example 3, which meant occurrence of the dissolution of polyethylene. That is, the dissolution temperature region of polyethylene was equal to that of Example 3 (96°-100° C.).

After further raising the temperature to 110° C., 2.15 Kg of sulfuryl chloride together with 3.0 g of benzoyl peroxide and 0.198 g of quinoline of the auxiliary catalyst were added to the autoclave, maintaining the temperature of 110° C., without cooling of the autoclave.

The reason why the addition amount of quinoline of the auxiliary catalyst is different from that of Example 3 lies in that it is a synthetic technique to make the addition amount of sulfur in the product to be 1.0 wt %.

After completion of the reaction, removal of the remaining acids, addition of the stabilizing agent and drying were carried out in the same manner in Example 3 to isolate the product. As a result of its analysis, it was recognized that this product contained 35.8 wt % of chlorine and 1.0 wt % of sulfur.

This chlorosulfonated polyethylene was subjected to curing in the same manner in Example 1 and its physical properties were measured. This result is shown in Table 1.

In this Comparative Example, excellent cold-proof was not obtained, because the reaction temperature was higher than the dissolution temperature of polyethylene.

TABLE 1

| | Physical Properties of Chlorosulfonated Polyethylene | | | | | | |
|---|---|---|---|---|---|---|---|
| | | Example 1 | Example 2 | Example 3 | Comparative Example 1 | Comparative Example 3 | Comparative Example 5 |
| Physical properties of cured material at ordinary temperature | Mooney Viscosity (ML$_{1+4}$, 100° C.) | 58 | 97 | 45 | 58 | 97 | 45 |
| | Hardness (JIS-A) | 60 | 60 | 60 | 60 | 60 | 60 |
| | Tensile Strength (Kg/cm$^2$) | 230 | 260 | 200 | 220 | 250 | 200 |
| | Elongation at Break (%) | 610 | 550 | 690 | 600 | 560 | 680 |
| | 300% Modulus (Kg/cm$^2$) | 48 | 50 | 40 | 48 | 50 | 40 |
| | Rebound Resilience (%) | 36 | 35 | 36 | 36 | 34 | 34 |
| | Compression Set (%) | 35 | 32 | 38 | 35 | 32 | 39 |
| Cold-proof of cured material | Hardness at 0° C. (JIS-A) | 76 | 76 | 74 | 91 | 91 | 92 |
| | Difference of Hardness at ordinary temperature and 0° C. | 16 | 16 | 14 | 31 | 31 | 32 |
| | Glass Transition temperature* (°C.) | −16 | −16 | −17 | −11 | −11 | −12 |

*Measurement was carried out by Vibron-DDV-IIIB with 3.5 Hz of number of frequency and 25μ of amplitude.

COMPARATIVE EXAMPLE 6

Employing the same autoclave as in Example 3, 1.0 Kg of the same polyethylene as in Example 3 and 10 Kg of carbon tetrachloride of solvent were charged thereinto, and the inside temperature was raised in the same manner as in Example 3. However, this temperature raising was carried out until the inside temperature reached 90° C., and thereafter its temperature was kept constant with stirring for 1 hour. This means that the temperature raising process was not carried out till the dissolution temperature region of polyethylene (96°–100° C.).

Maintaining the inside temperature to be 90° C., the reaction was started by adding 2.15 Kg of sulfuryl chloride together with 3.0 g of benzoyl peroxide and 0.138 g of quinoline of the auxiliary catalyst into the autoclave. That is, the reaction temperature was equal to that of Example 3.

Thereafter, removal of the remaining acids and addition of the stabilizing agent were carried out in the same manner as in Example 3, and the resultant polymer solution was taken out thereof.

The polymer solution taken out was a heterogeneous solution wherein particles of polyethylene suspended in carbon tetrachloride, because the dissolution of polyethylene was not carried out. The product like this had no merchandise value as chlorosulfonated polyethylene.

Referring to these Examples and Comparative Examples stated above, it is understood that the chlorosulfonated polyethylene manufactured by this invention has low hardness

What is claimed is:

1. A process for producing an excellent cold-proof chlorosulfonated polyethylene comprising:
    dissolving polyethylene in a halogenated hydrocarbon solvent by heating the halogenated hydrocarbon solvent to a temperature higher than the dissolution temperature region of the polyethylene to form a homogeneous solution,
    then lowering the temperature of the homogenous solution to a temperature of not greater than the dissolution temperature region of the polyethylene, and maintaining the homogenous solution,
    and then reacting the polyethylene with a reactant consisting essentially of sulfuryl chloride, said reaction being conducted in the presence of a radical generating agent.

2. The process as recited in claim 1, wherein the rate of reducing the temperature from greater than the dissolution temperature region to not greater than the dissolution temperature region is not less than 1° C./minute.

* * * * *